United States Patent [19]

Thomas

[11] 4,379,281
[45] Apr. 5, 1983

[54] ALARM SYSTEM FOR BICYCLES AND THE LIKE

[76] Inventor: John C. Thomas, 2984 Canna St., Thousand Oaks, Calif. 91360

[21] Appl. No.: 303,343

[22] Filed: Sep. 18, 1981

[51] Int. Cl.³ .............................................. B60R 25/10
[52] U.S. Cl. .................................. 340/63; 200/61.54; 307/10 AT; 340/686
[58] Field of Search ................... 340/63, 686; 116/33; 200/61.54, 61.56; 307/10 AT

[56] References Cited

U.S. PATENT DOCUMENTS

| | | | |
|---|---|---|---|
| 550,229 | 11/1895 | McDonald et al. | 340/571 |
| 618,726 | 1/1899 | Phelps | 340/63 |
| 1,239,602 | 9/1917 | Johnston | 340/63 |
| 1,268,915 | 6/1918 | Beall | 340/63 |
| 1,301,493 | 4/1919 | Niemeyer | 340/63 |
| 1,309,351 | 7/1919 | Centoni | 340/63 |
| 3,500,008 | 3/1970 | McClure | 200/61.54 |
| 3,781,861 | 12/1973 | Adler et al. | 340/280 |
| 3,824,540 | 7/1974 | Smith | 340/63 |
| 3,866,205 | 2/1975 | Payne | 340/280 |
| 3,975,645 | 8/1976 | Morar | 340/63 X |

FOREIGN PATENT DOCUMENTS

| | | | |
|---|---|---|---|
| 177543 | 10/1906 | Fed. Rep. of Germany | 340/63 |
| 116593 | 6/1918 | United Kingdom | 340/63 |

*Primary Examiner*—John W. Caldwell, Sr.
*Assistant Examiner*—Joseph E. Nowicki
*Attorney, Agent, or Firm*—Koppel & Harris

[57] ABSTRACT

An alarm system for bicycles and the like in which a collar having an undulating exterior surface is mounted on the handlebar post and rotates therewith. A moveable trigger member, preferably a spring biased pin, is mounted to the bicycle chassis adjacent the collar. Unauthorized rotation of the handlebars causes the collar to rotate against the trigger member, moving that member to close a set of contacts and thereby complete an electrical alarm circuit. The alarm circuit is controlled by a latching relay which hold the alarm on until either an automatic timing device operates to terminate the alarm, or the system is turned off by a key-operated lock. The trigger member closes another set of contacts to actuate the alarm if the bicycle is tampered with by removing the collar.

4 Claims, 3 Drawing Figures

U.S. Patent     Apr. 5, 1983     4,379,281
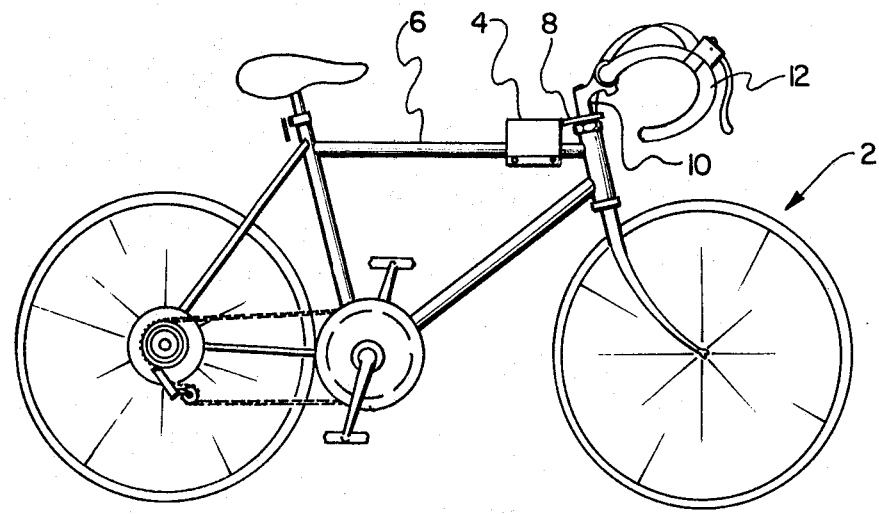
Fig.1.
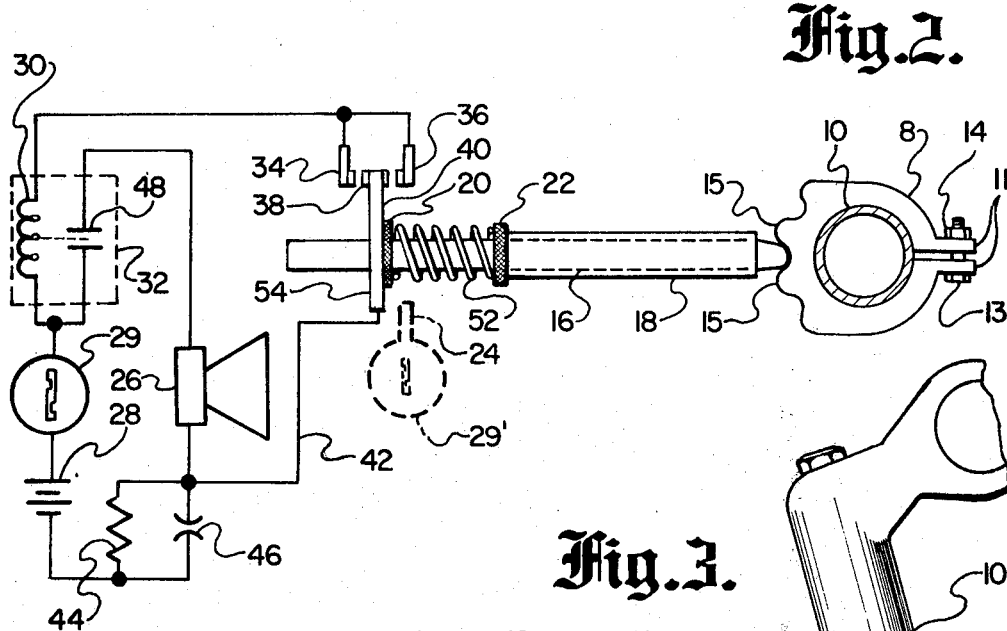
Fig.2.
Fig.3.
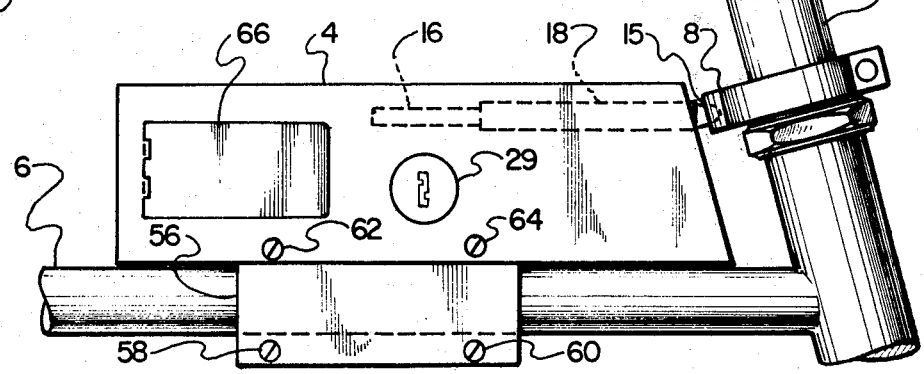

ALARM SYSTEM FOR BICYCLES AND THE LIKE

BACKGROUND OF THE INVENTION

1. Field of the Invention

This invention relates to an alarm system for bicycles and the like, and more particularly to an alarm system which is actuated by movement of the bicycle.

2. Description of the Prior Art

Various systems have been proposed in the past for actuating an alarm on a bicycle or similar vehicle to prevent its being stolen or tampered with. Several of these systems provide an audible alarm as an adjunct of a bicycle lock. For example, in U.S. Pat. No. 3,866,205 to Payne et al a gas-filled cylinder is mounted on a bicycle with a gas tube that can be wound around a support and locked back on the cylinder, thus locking the bicycle to the support. If the tube is cut the decrease in pressure within the cylinder actuates an alarm. Another system using the same general approach of a combination lock and alarm is disclosed in U.S. Pat. No. 3,824,540 to Smith. In this patent a cable is wound through the bicycle wheels and the frame to immobilize the wheels. An electrical conductor runs through the length of the cable and activates an alarm when it is cut. A similar approach is taken in U.S. Pat. No. 3,791,861 to Adler, in which a cable is used to lock a bicycle to a support. Cutting the cable interrupts an electrical connection and causes the alarm to be sounded.

A different device that actuates an alarm without the use of a locking system is disclosed in U.S. Pat. No. 550,229 to McDonald et al. In this patent metal tape is wrapped around the opposite gripping ends of the handlebars. Pressure sensitive switches under the tape are connected with a battery and bell circuit such that touching one or the other of the handles causes a bell to ring. If both handles are gripped at the same time an electrical shock is administered.

While each of the above systems is designed to operate an alarm if an attempt is made to steal or otherwise remove a bicycle, there is still a need for a simple alarm system that is activated whenever a bicycle is moved, and which does not injure the person moving it. It would also be desirable for such a system to be inexpensive, to not interfere with the normal operation of the bicycle, and to not require any extraneous equipment to carry such as chains or cables.

SUMMARY OF THE INVENTION

In view of the above problems associated with the prior art, it is an object of the present invention to provide a novel and improved alarm system for a bicycle or similar vehicle which is actuated when the bicycle is tampered with.

Another object is the provision of such an alarm system in which the alarm is set off simply by an appreciable unauthorized movement of the handlebars.

Another object is the provision of an alarm system for bicycles and the like which does not require either a separate locking system for its operation, or any extraneous equipment not directly attached to the protected vehicle.

Yet another object is the provision of such an alarm system in which the alarm once actuated becomes latched, even though the unauthorized user may have released the bicycle.

Still another object is the provision of an alarm system for a bicycle or the like which is actuated when either the bicycle, or the alarm itself is tampered with.

A further object is the provision of a novel and improved alarm system for bicycles and the like which is relatively simple, inexpensive and non-injurious in use.

In the realization of these and other objects of the invention, the present invention contemplates an alarm system for bicycles and similar devices which have a chassis and handlebars mounted on a rotatable post. A collar having an undulating exterior surface, preferably a series of adjacent cams, is mounted on the handlebar post and rotates therewith. A trigger member, preferably in the form of a pin, is mounted on the chassis and spring biased toward an inward position seated against the undulating collar surface so that rotation of the handlebar post moves the pin to an outward position as it tracks the undulating collar surface. An alarm which is also mounted on the chassis is actuated when the trigger member moves to its outward position.

In a preferred embodiment an energizing circuit is provided for the alarm, the energizing circuit having an electrical contact which is contacted by a corresponding electrical contact on the trigger member when that member is moved outward, thereby completing an alarm energization circuit. The circuit also includes a relay which is energized when contact is made between the two electrical contacts. The relay includes a pair of latching contacts which complete the alarm circuit and hold that circuit in an energized state even after the first two electrical contacts have separated. A third electrical contact is positioned near the trigger member where it is contacted by inward movement of that member if the collar is removed, thereby providing an alternate path to complete the alarm circuit when the alarm system itself is tampered with. A key-operated lock is also provided to prevent energization of the alarm when desired.

These and other features and advantages of the invention will be apparent to those skilled in the art from the following detailed description, taken together with the accompanying drawings, in which:

BRIEF DESCRIPTION OF THE DRAWINGS

FIG. 1 is an elevation view of a bicycle on which an alarm system constructed in accordance with the invention is mounted;

FIG. 2 is an electro-mechanical diagram illustrating the operation of the alarm system; and FIG. 3 is a side elevation view showing the relative positions of the system components when mounted on a bicycle.

DESCRIPTION OF A PREFERRED EMBODIMENT

Referring to FIG. 1, a bicycle 2 is shown with the alarm system of the present invention mounted thereon. The alarm system including a housing 4 which houses the alarm itself, a battery for powering the alarm, an energizing circuit, and a trigger mechanism, all of the latter components being mounted within the housing on cross-bar 6 of the bicycle chassis. Housing 4 is preferably constructed of heavy duty force-resistance aluminum, steel or other high strength force resistance material, such as reinforced fiberglass or other high strength plastic. A collar 8 which initiates the operation of the alarm system is clamped to a post 10 which carries handlebars 12. While a particular style of bicycle is shown, it should be understood that the invention is applicable to other vehicles such as motorcycles, scooters and mopeds having handlebars or an equivalent steering mechanism, such as a steering wheel, mounted on a rotatable post.

The alarm system is designed so that any appreciable rotation of handlebar post 10 is sensed by the interaction between collar 8 and the trigger mechanism of housing 4, causing the alarm to go off. Thus, the owner of the bicycle may leave it unattended once the alarm has been set by means of a key-operated lock or similar device described below, without locking the bicycle to a rack or other support, and without immobilizing the wheels. The alarm is set off if the handlebars are subsequently moved by an unauthorized user, producing a loud tone or siren sound to scare away the intruder. As it is quite difficult to move the bicycle without turning the handlebar post, especially if the thief is not aware of the nature of the alarm mechanism, the alarm will be set off for virtually any unauthorized taking of the bicycle.

Details of the operational components of the alarm system are illustrated in FIG. 2. Collar 8 includes a pair of spaced parallel lugs 11, and is clamped to post 10 by means of a bolt 13 extending through the lugs and tightened into nut 14. It will be seen that the other side of collar 8 has an undulating exterior surface which forms a plurality of adjacent cams 15. Mounted on the chassis within housing 4 (not shown in FIG. 2) is a pin member 16 which serves as a trigger to actuate the alarm. Pin 16 extends through and is guided by an outer tubular casing 18, which in turn is fastened to housing 4. Both cams 15 and pin 16 are preferably made of case hardened aluminum. A washer or similar device 20 is affixed to pin 16 toward its outer end away from collar 8, and a similar washer 22 is provided at the outer end of casing 18. Both casing 18 and washer 22 have sufficient inside diameters to permit free longitudinal movement of pin 16 back and forth, while preventing any significant sideward movement of the pin.

A coil spring 52 is affixed at its opposite ends to washers 20 and 22. In mounting the alarm assembly on the bicycle, as directed by written instructions accompanying the system, housing 4 is moved to a forward position on the chassis such that the forward end of pin 16 is seated against the surface of collar 8 between adjacent cams 15, with pin 16 pushed back into casing 18 and compressing spring 52. Pin 16 is thus normally spring-biased inwardly against collar 8, whereby rotation of the collar in response to rotation of the handlebars forces pin 16 further backwards as one of the cams 15 is rotated under the pin. If, on the other hand, collar 8 is removed from the bicycle, pin 16 is moved forward by spring 52 into the space previously occupied by the collar.

The alarm device itself consists of a siren, horn or the like 26 which is powered by a battery 28 of the type commonly purchased at consumer stores. The positive terminal of battery 28 is connected through a key operated disconnect lock 29 and the energizing coil 30 of a latching relay, shown enclosed in dashed lines 32, to a pair of opposed electrical contacts 34 and 36 which are mounted in a fixed position within housing 4. The opposed contact faces of contacts 34 and 36 are separated by a distance somewhat less that the permissible forward and backward movement traversed by pin 16 as it tracks a cam 15 or moves forward upon removal of collar 8. A further electrical contact member 38 is mounted toward the rear of pin 16 on upstanding stem 40. Contact 38 is positioned between contacts 34 and 36 and, when pin 16 is seated against collar 8 between adjacent cams thereof, is separated from both contacts 34 and 36. Contact 38 is electrically connected by a lead 42 to a RC timing circuit consisting of parallel connected consisting of parallel connected resistor 44 and capacitor 46, the opposite end of which circuit is connected to the negative terminal of battery 28.

Relay coil 30 controls a set of latching contacts 48, one of which is connected to lock 29 and then to the positive terminal of battery 28 in common with the relay coil, and the other of which is connected to an energizing input terminal on alarm 26.

In addition to opening the circuit between battery 28 and relay 32 in response to operation of its key, lock 29 is also coupled with the relay to reset the relay contacts to an open position when the key is turned to an "OFF" position. The alarm also has an energizing output terminal which is connected in common with lead 42 to the RC timing circuit 44, 46. The timing circuit is designed to prevent excessive drain on the battery by alarm 26 or relay coil 30. The resistance value of resistor 44 is large enough so that, without the presence of capacitor 46, both the circuit through alarm 26 and relay contacts 48 and the circuit through relay coil 30 would be effectively open circuited. Since capacitor 46 appears as a short circuit when the relay coil is first energized, sufficient current is initially available to close relay contacts 48 and actuate the alarm. Gradually, however, capacitor 46 will become charged and appear more and more as an open circuit. The particular values of resistor 44 and capacitor 46 are selected so that the current through alarm 26 will diminish to a level insufficient to actuate the alarm after a predetermined period of time calculated to be sufficient to scare away a thief. Other conventional electrical or electro-mechanical timing devices could also be used in place of the RC circuit shown.

Relay 32 is of the latching type, in which the energization of coil 30 causes contacts 48 to close and remain closed until manually reset even after coil 30 has become de-energized. Lock 29 is operated by a key to interrupt or complete a circuit between the relay and the battery, as desired by the bicycle owner. Lock 29 is also used to lock a battery compartment within housing 4. If the lock is located at the position shown in dashed lines in FIG. 2, with an upstanding stem 24 located adjacent a lower extension 54 of stem 40, the lock can also be used to test the battery by inserting the key to rotate stem 24 to the left against extension 54, moving pin 16 outward to establish contact between contacts 34 and 38.

FIG. 3 shows the alarm system mounted on the bicycle and the exterior features of housing 4. A pair of mounting flanges 56, one of which can be seen in the figure, are provided at the underside of housing 4. The housing is held securely onto the bicycle frame by bolting the two flanges about crossbar 6 by means of bolts 58 and 60. Two adjustment pins 62, 64 are provided for adjusting the height of housing 4 to assist in properly aligning trigger pin 16 with collar 8. Any conventional mechanism can be used to effect the height adjustment. Lock 29 is positioned adjacent and controls the opening of a door 66 to a compartment for battery 28.

The operation of the alarm system will now be described. Assume first that housing 4 has been mounted to the bicycle such that, when pin 16 is seated against collar 8 between adjacent cams 15 thereof, electrical contact 38 is positioned between and out of touch with contacts 34 and 36, as shown in FIG. 2. When the bicycle owner wants to leave the bicycle he merely positions the handlebars so that pin 16 rests in a forward position between adjacent cams of collar 8, as shown in FIG. 2, and uses his key to operate lock 29 so that it closes the circuit between battery 28 and relay 32. The alarm is now set so that anyone tampering with the bicycle will cause it to go off. If someone should start to move the bicycle, the movement of the handlebars will cause collar 8 to rotate under pin 16 and push the pin back. The backward movement of pin 16 causes electrical contact 38 to establish contact with electrical contact 34, thereby completing a circuit to energize relay coil 30. Current begins to flow from the battery through lock 29, relay coil 30, contacts 34 and 38, lead 42 and capacitor 46 (which initially appears as a closed circuit to the DC energizing signal) back to the negative battery terminal. If the energizing circuit for relay coil 30 remains closed, current flow is progressively shifted from capacitor 46 to resistor 44 as capacitor 46 charges. Charging at the capacitor also increases the effective impedance of the energizing circuit, thereby significantly reducing the drain on battery 28.

The energization of relay coil 30 causes latching contacts 48 to close, thereby completing an energization circuit for alarm 26 through the alarm and RC timing circuit 44,46. Contacts 48 remain latched in a closed position until manually reset by operation of lock 29, even if the person tampering with the bicycle interrupts the energization circuit for relay coil 30 by rotating the handlebars to return them to their original position with pin contact 38 out of contact with contact 34.

In the event of collar 8 being removed by a thief in an attempt to prevent triggering the alarm system, pin 16 moves forward under the influence of spring 52 to bring contact 38 into contact with contact 36. This again completes a circuit for energizing relay coil 30, and the alarm will operate as described above.

While collar cams 15 extend outwardly from the collar a sufficient distance to insure that proper circuit connections are made when the handlebar is rotated, their rise is gradual so that there is no impediment to turning the handlebars in the normal operation of the bicycle.

If the bicycle owner hears the alarm before the RC timing circuit has had time to operate, he can turn the alarm off by simply inserting his key into lock 29 and rotating it to a disconnect position. The owner would also set the lock at a disconnect position whenever he is going to mount or move the bicycle, to avoid unintended operation of the alarm.

While a particular embodiment of the invention has been shown and described, numerous modifications and variations will occur to those skilled in the art. For example, a mechanical interconnect could be provided to turn the alarm off, rather than the electrical interrupt provided by lock 29. Also, a microswitch could be added to the battery compartment to actuate the alarm when the compartment cover is opened by someone seeking to remove the battery and thereby disable the alarm system. It is accordingly intended that the invention be limited only in terms of the appended claims.

I claim:

1. An alarm system for bicycles and the like having a chassis and handlebars mounted on a rotatable post, comprising:

a collar having an undulating exterior surface and including means for being mounted on the handlebar post to rotate therewith, a pin member carrying a first electrical contact means, means for mounting said pin member on said chassis with said pin member longitudinally directed toward said collar, spring means urging said pin member toward an inward position seated against the undulating collar surface, whereby said pin is moved to an outward position by the undulating collar surface in response to rotation of the handlebar post, an electrically operated alarm, an energizing circuit for said alarm, said circuit comprising means for receiving a source of electrical power, a second electrical contact means positioned to be contacted by the first electrical contact means in response to outward movement of the pin member when the handlebar post is rotated, and circuit means connected to complete an energization circuit for the alarm in response to contact being made between the first and second electrical contact means, and a third electrical contact means held opposed to and electrically connected to the second electrical contact means on the collar side of the first electrical contact means, said third contact means positioned to be contacted by the first contact means moving inwardly under the influence of the spring means in response to removal of the collar, and thereby complete the alarm energizing circuit when the collar is removed.

2. The alarm system of claim 1, said circuit means including a relay connected to be energized in response to contact being made between the first and second electrical contact means, said relay including a pair of latching contacts connected to complete a latched circuit between the alarm and said source of electrical power in response to energization of the relay, said latched circuit continuing to energize the alarm after the first and second electrical contact means have separated.

3. The alarm system of claim 2, further comprising a key-operated lock connected in the latched circuit to prevent energization of the alarm when the key is turned to an "off" position.

4. The alarm system of claim 1, further comprising a timing means actuated in response to operation of the alarm system and adapted to discontinue operation of the alarm after a predetermined period of time.

* * * * *